(12) United States Patent
Tsukimura

(10) Patent No.: US 7,948,546 B2
(45) Date of Patent: May 24, 2011

(54) SOLID-STATE IMAGING APPARATUS HAVING A GLOBAL SHUTTER FUNCTION, ADAPTED TO BE CAPABLE OF SUPPRESSING A REDUCTION IN RESOLUTION

(75) Inventor: Mitsuhiro Tsukimura, Hachioji (JP)

(73) Assignee: Olympus Corporation, Tokyo (JP)

( * ) Notice: Subject to any disclaimer, the term of this patent is extended or adjusted under 35 U.S.C. 154(b) by 545 days.

(21) Appl. No.: 11/871,645

(22) Filed: Oct. 12, 2007

(65) Prior Publication Data
US 2008/0088726 A1   Apr. 17, 2008

(30) Foreign Application Priority Data

Oct. 13, 2006   (JP) .................................. 2006-279631

(51) Int. Cl.
*H04N 3/14* (2006.01)
(52) U.S. Cl. .......................... 348/308; 348/296; 348/302
(58) Field of Classification Search .................. None
See application file for complete search history.

(56) References Cited

U.S. PATENT DOCUMENTS

| | | | | |
|---|---|---|---|---|
| 6,522,356 | B1 * | 2/2003 | Watanabe | 348/272 |
| 6,822,211 | B2 * | 11/2004 | Hagihara | 348/308 |
| 6,838,651 | B1 * | 1/2005 | Mann | 250/208.1 |
| 7,580,072 | B2 * | 8/2009 | Mizoguchi | 348/296 |
| 2003/0193585 | A1 * | 10/2003 | Ogura et al. | 348/272 |
| 2004/0046881 | A1 * | 3/2004 | Utagawa | 348/294 |

FOREIGN PATENT DOCUMENTS

JP       2006108889 A     4/2006

* cited by examiner

*Primary Examiner* — Luong T Nguyen
(74) *Attorney, Agent, or Firm* — Westerman, Hattori, Daniels & Adrian, LLP

(57) ABSTRACT

A solid-state imaging apparatus including a solid-state imaging device having a pixel section having unit pixels for generating imaging signal associated with an object each formed of a first pixel and a second pixel adjacent to the first pixel, a read drive section where one or more pixels of the first and second pixels are respectively treated as a read unit group so as to effect read operation by the read unit group based on a setting signal inputted from an external source, and an output section for generating a difference signal between signals outputted from the first and second pixels to output it as an imaging signal associated with the unit pixel; and a section for interpolating an imaging signal at a predetermined location between the unit pixels based on imaging signals outputted from the difference signal output section.

3 Claims, 10 Drawing Sheets

SOLID-STATE IMAGING APPARATUS HAVING A GLOBAL SHUTTER FUNCTION, ADAPTED TO BE CAPABLE OF SUPPRESSING A REDUCTION IN RESOLUTION

This application claims benefit of Japanese Patent Application No. 2006-279631 filed in Japan on Oct. 13, 2006, the contents of which are incorporated by this reference.

BACKGROUND OF THE INVENTION

The present invention relates to solid-state imaging apparatus, more specifically, solid-state imaging apparatus having a concurrent shutter (also referred to as global shutter) function, adapted to be capable of suppressing a reduction in resolution even when using a method where signal obtained by differentiating pixel signals of two pixels is outputted as imaging signal.

MOS solid-state imaging devices are known as using pixels having amplification/read function as a solid-state imaging device. FIG. 1 shows a pixel construction of a MOS solid-state imaging device. In FIG. 1, what is denoted by 100 is an individual pixel. The individual pixel 100 includes: 101, a photodiode serving as photoelectric conversion device; 102, a transfer transistor for transferring signal charge generated at photodiode 101 to a charge accumulation section (FD) 103; 104, a reset transistor for resetting the photodiode 101 and charge accumulation section 103; 105, an amplification transistor for amplifying and reading voltage Level at the charge accumulation section 103; and 106, a select transistor for selecting the pixel so as to transmit an output of the amplification transistor 105 to a vertical signal line 114. These but photodiode 101 are shielded from light.

Further, denoted by 110 is a pixel power supply for applying a power supply voltage VDD, which is electrically connected to drain of the amplification transistor 105 and to drain of the reset transistor 104. Denoted by 111 is a reset line to which row reset signal φRSi for resetting pixels corresponding to one row is applied, which is connected to the gate of reset transistor 104 of the pixels corresponding to one row. Denoted by 112 is a transfer line to which row transfer signal φTXi for transferring the signal charge of each pixel corresponding to one row to the charge accumulation section 103 of the respective pixel is applied, which is electrically connected respectively to the gate of transfer transistor 102 of the pixels corresponding to one row. Denoted by 113 is a select line to which row select signal φSELi for selecting pixels corresponding to one row is applied, which is electrically connected respectively to the gate of select transistor 106 of the pixels corresponding to one row. With the pixel construction using four transistors in this manner, a photoelectric conversion function, reset function, amplification/read function, temporary memory function, and select function are achieved.

A pixel array is formed by arranging pixels having such construction into "m" rows and "n" columns, where a normal XY-addressing read method using a vertical scanning circuit and horizontal scanning circuit (not shown) is employed to sequentially select and read pixel signals row by row from the first to m-th rows so as to read all pixel signals.

In such normal XY-addressing read method, however, the point in time for transferring/accumulating signal to/at the charge accumulation section 103 is different from one row to another of the pixel array. More specifically, there is a difference in time corresponding to one frame at maximum between the first row to be read out first and m-th row to be read out at the end. For this reason, a problem of distorted image occurs when a rapidly moving object is photographed.

The global shutter read method is a method for solving the above problem in such normal XY-addressing read method. An operation of the global shutter read method will now be described with reference to the timing chart shown in FIG. 2. First, as row reset signals φRS1 to φRSm and row transfer signals φTX1 to φTXm of all rows are simultaneously outputted from the vertical scanning circuit (not shown), photodiodes 101 of the pixels corresponding to all rows are reset. Subsequently, after a certain signal accumulation period (exposure period), row transfer signals φTX1 to φTXm of all rows are simultaneously outputted from the vertical scanning circuit. The signal charges accumulated within the exposure period at photodiode 101 of the pixels corresponding to all rows are thereby transferred simultaneously for all rows to the charge accumulation section 103. A global shutter operation is effected by such operation.

A row-by-row readout of signal charges accumulated at electric charge accumulation section 103 is then started. First, as row select signal φSEL1 is outputted, pixels of the first row are selected and signal levels of the pixels are read out. Further, as row reset signal φRS1 is outputted, the electric charge accumulation sections 103 of the pixels of the first row are reset, and the reset levels of the pixels are read out. When the readout of signal level and reset level of the pixels of the first row are complete, pixels of the second row are selected, and the signal level and reset level thereof are read out. By performing this signal read scanning until m-th row, signals of one frame are read out.

Further, one having construction as will be described below in a solid-state imaging device using a pixel array where individual pixels of the pixel construction as shown in FIG. 1 are arranged into "2m" rows and "n" columns has been proposed in Japanese Patent Application Laid-Open 2006-108889. In particular, as shown in FIG. 3, a signal-to-be pixel group 200-1, 200-2, . . . where signals of photodiode are simultaneously reset of all pixels and, after completion of a predetermined exposure period, the signals generated at photodiode are transferred to the charge accumulation section, and a correcting pixel group 300-1, 300-2, . . . where the signals generated at photodiode are not transferred to the charge accumulation section are provided alternately on every other row in the pixel array so that difference between the respective signal outputs of the signal-to-be pixel group 200-1, 200-2, . . . , and of the correcting pixel group 300-1, 300-2, . . . is obtained and outputted as image signal.

FIG. 4 shows a timing chart for explaining operation of the solid-state imaging device having such construction. In FIG. 4, "1M to mM rows" refers to the first to m-th rows of the signal-to-be pixel group 200-1, 200-2, . . . , and "1S to mS rows" refers to the first to m-th rows of the correcting pixel group 300-1, 300-2, . . . , etc.

According to thus constructed solid-state imaging apparatus, if signals are sequentially read out row by row after concurrently transferring the signal charges to the charge accumulation section, signal retaining time at the charge accumulation section of the pixels of the rows to be read out late becomes relatively longer so that shading resulting from leak current or leakage light tends to occur. An occurrence of such shading, however, can presumably be prevented by using the technique where a difference signal is obtained as described above.

SUMMARY OF THE INVENTION

In a first aspect of the invention, there is provided a solid-state imaging apparatus including: a solid-state imaging device including a pixel section having unit pixels for generating imaging signal associated with an object each formed of a first pixel and a second pixel adjacent to the first pixel where a plurality of the unit pixels are two-dimensionally arranged so that a shift in a first direction occurs between the unit pixels arranged in the first direction and the unit pixels arranged in the first direction so as to be adjacent thereto in a second direction different from the first direction, a read drive section where one or more pixels of the first pixels and one or more pixels of the second pixels are respectively treated as a read unit group so as to effect read operation by the read unit group based on a setting signal inputted from an external source, and a difference signal output means for generating a difference signal between a signal outputted from the first pixel and a signal outputted from the second pixel to output it as an imaging signal associated with the unit pixel; and an interpolating operation section for interpolating an imaging signal at a predetermined location between the unit pixels based on imaging signals outputted from the difference signal output means.

In a second aspect of the invention, the first and the second pixels in the solid-state imaging apparatus according to the first aspect have respectively a photoelectric conversion device, an accumulation section for accumulating a signal generated at the photoelectric conversion device, and a transfer section for transferring signal generated at the photoelectric conversion device to the accumulation section. The read drive section simultaneously resets all first and second pixels and, after a predetermined time, drives the transfer section of all of the first pixels to transfer signals generated at the photoelectric conversion device during the predetermined time to the accumulation section, and subsequently causing signals accumulated at each accumulation section of the first pixels and the second pixels to be outputted to the difference signal output means.

In a third aspect of the invention, the first and the second pixels in the solid-state imaging apparatus according to the first aspect have respectively a photoelectric conversion device, an accumulation section for accumulating a signal generated at the photoelectric conversion device, and a transfer section for transferring signal generated at the photoelectric conversion device to the accumulation section. The read drive section simultaneously resets all of the first pixels and, after a predetermined time, simultaneously resets all of the second pixels, and subsequently driving each transfer section of the first and the second pixels to transfer signals generated at the photoelectric conversion device to each accumulation section and causing signals accumulated at each accumulation section of the first pixels and the second pixels to be outputted to the difference signal output means.

DESCRIPTION OF THE PREFERRED EMBODIMENTS

Some embodiments of the solid-state imaging apparatus according to the invention will be described below with reference to the drawings.

Embodiment 1

Figure 1:
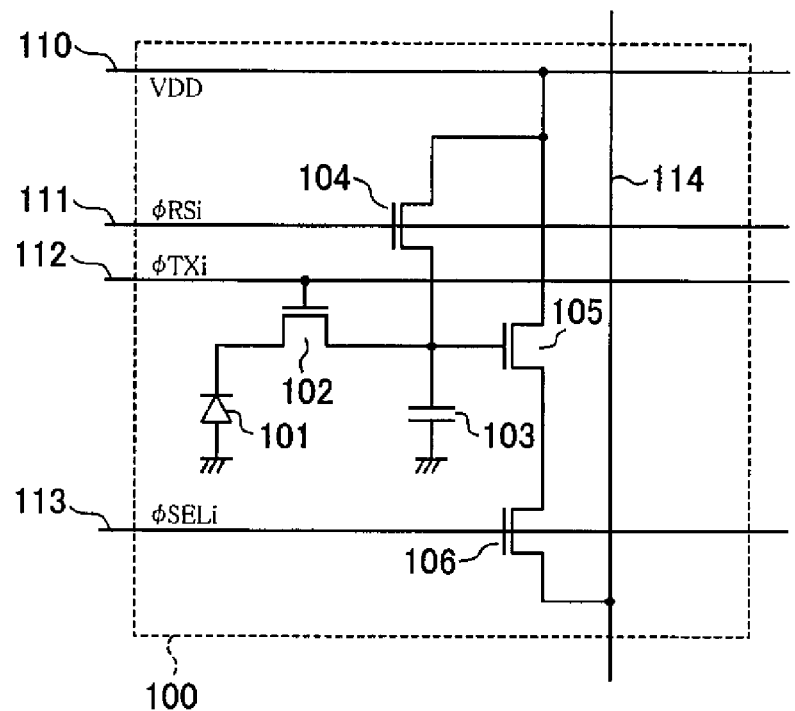
FIG. 1 is a circuit diagram showing a pixel construction of prior-art MOS imaging device.
Figure 2:
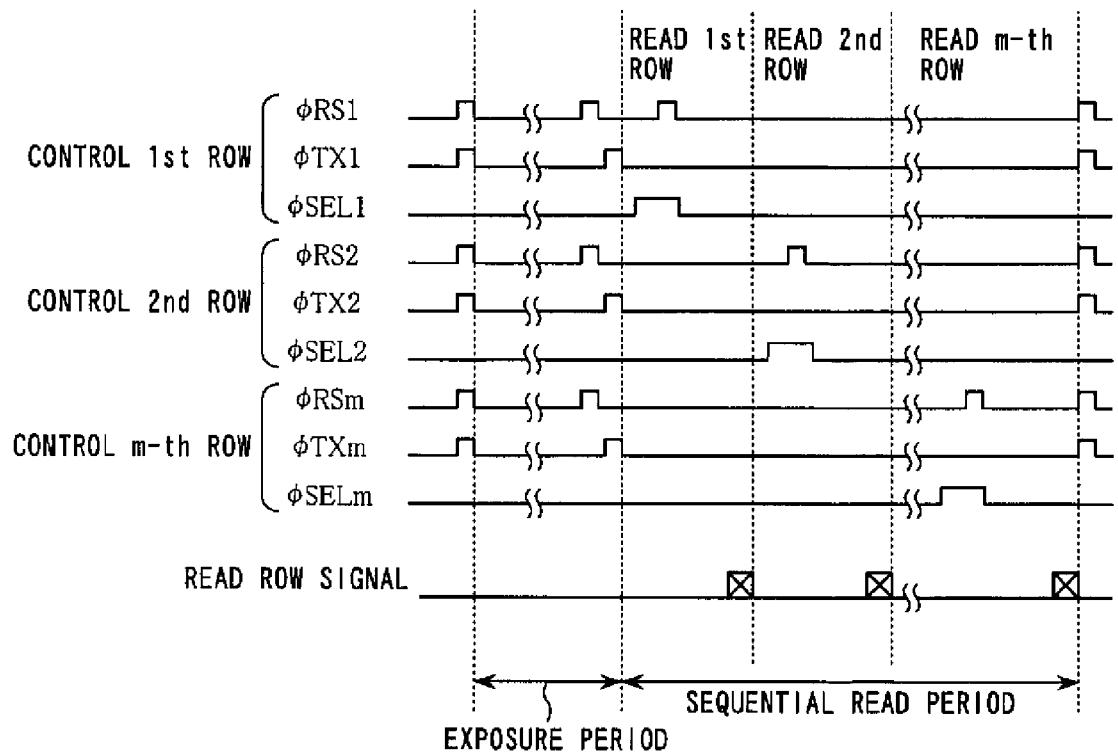
FIG. 2 is a timing chart for explaining operation of a global shutter read method of prior-art MOS imaging device.
Figure 3:
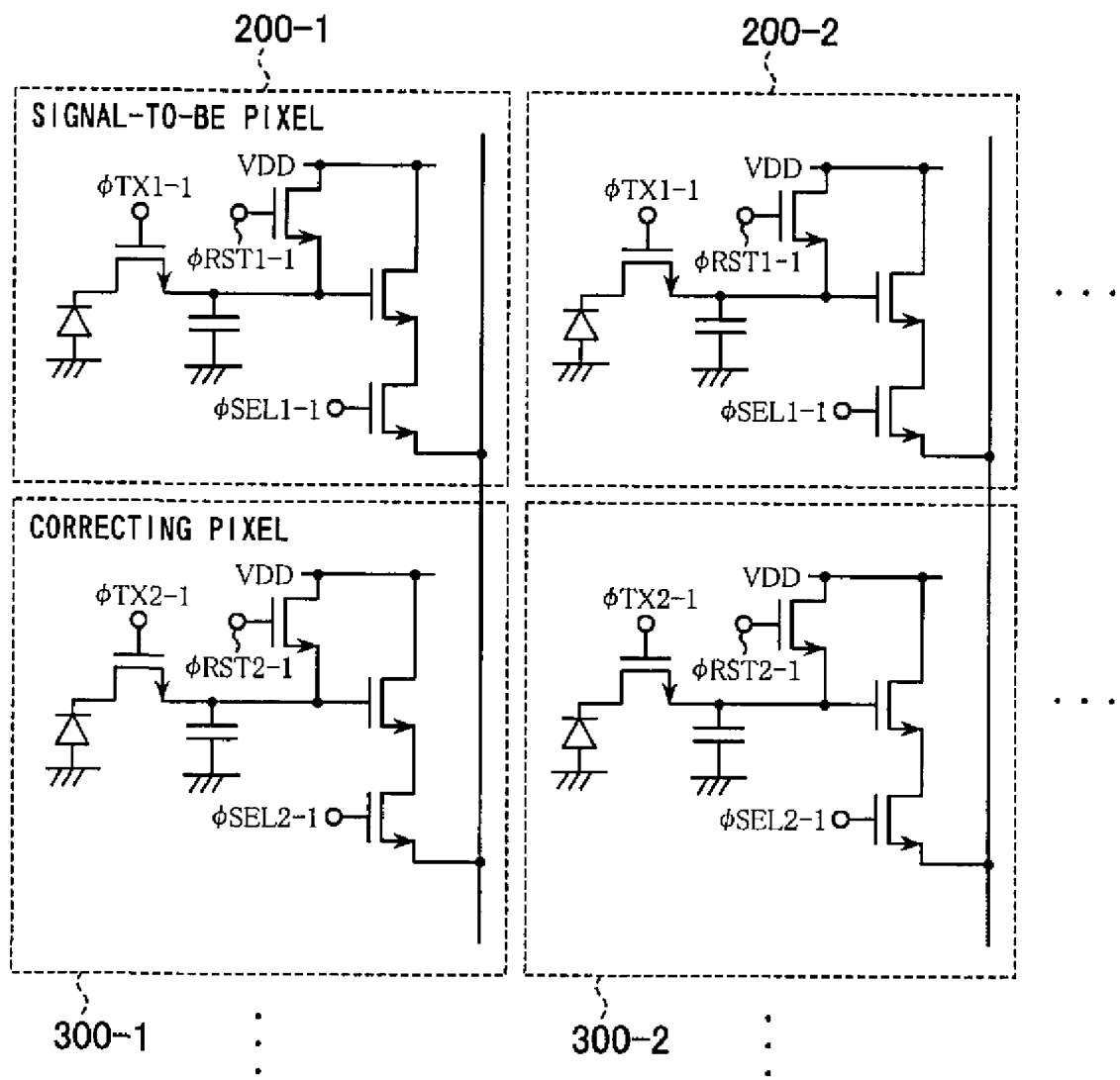
FIG. 3 shows construction of the pixel section of another prior-art MOS imaging device.
Figure 4:
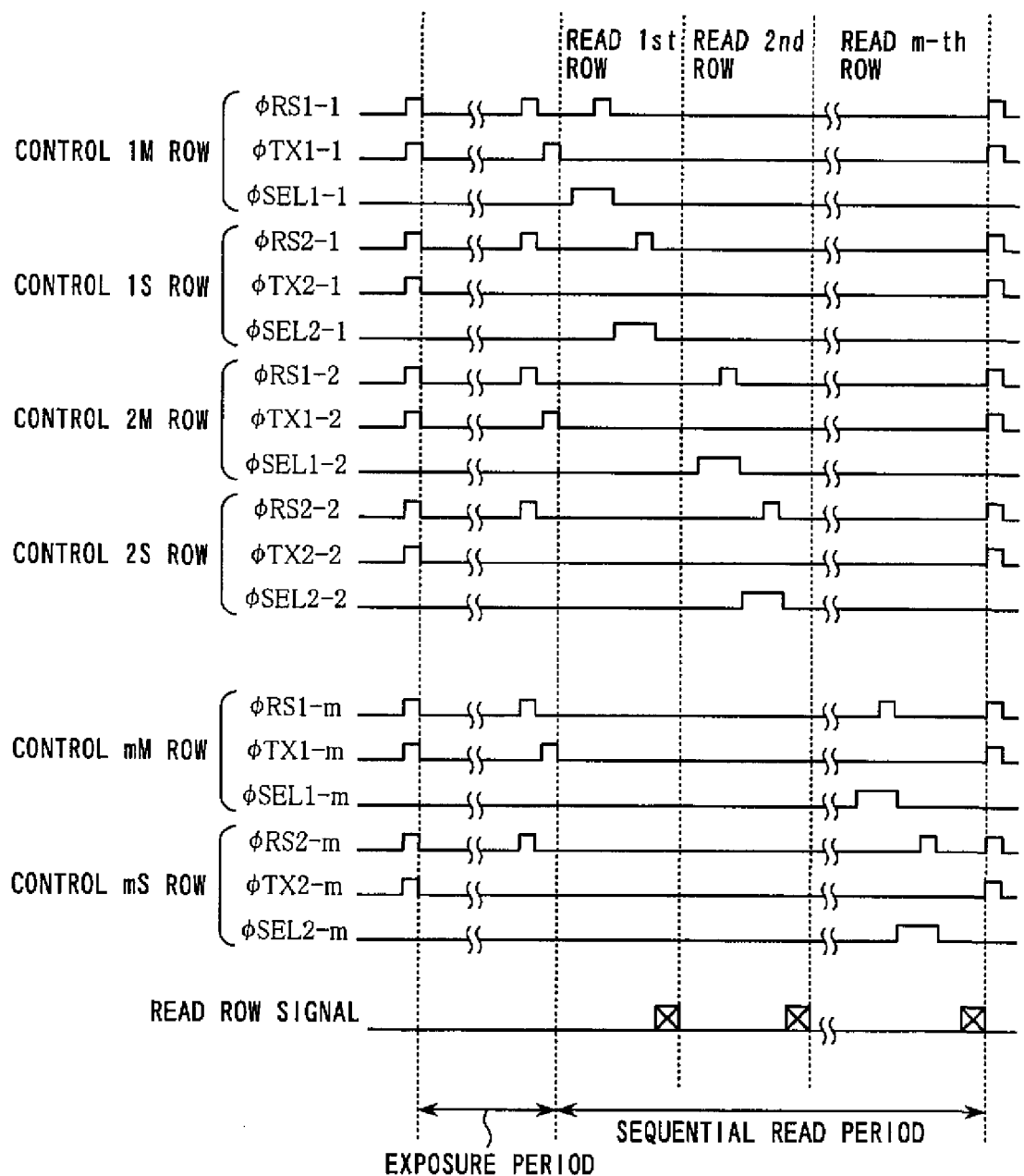
FIG. 4 is a timing chart for explaining signal read operation of the pixel section of the prior-art example shown in FIG. 3.
Figure 5:
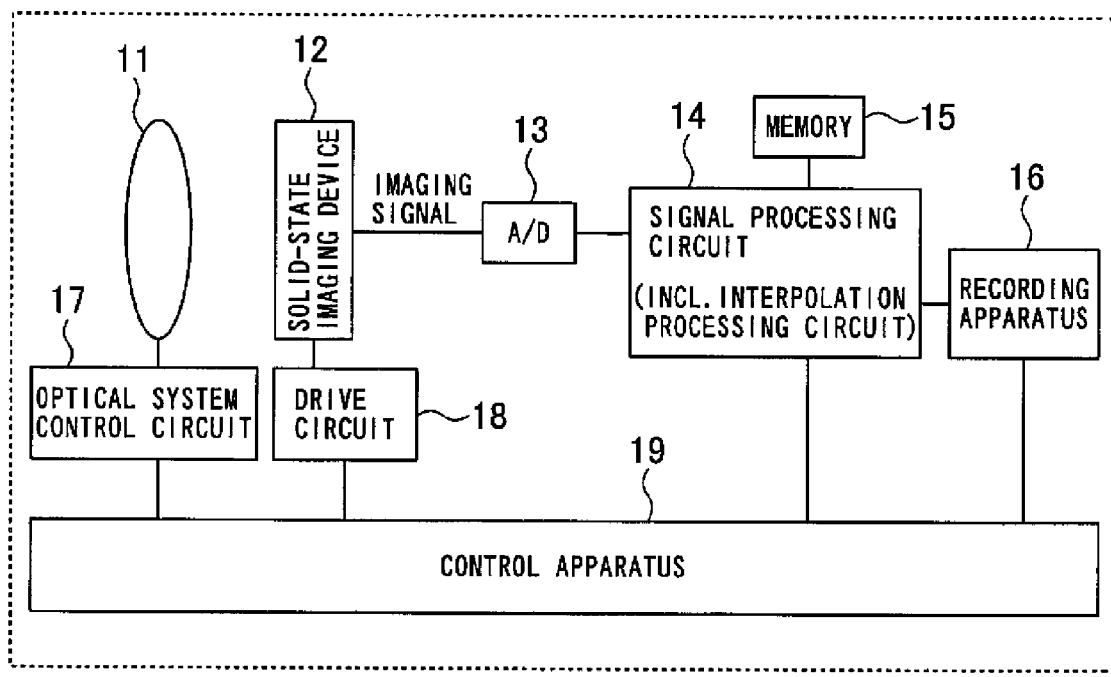
FIG. 5 is a schematic block diagram showing construction of an electronic camera using a first embodiment of the solid-state imaging apparatus of the invention.

A fundamental construction of electronic camera using the solid-state imaging apparatus according to a first embodiment of the invention will now be described by way of the block diagram in FIG. 5. FIG. 5 includes: 11, an imaging optical system; 12, a solid-state imaging device; 13, A/D converter; 14, a signal processing circuit containing an interpolation processing circuit; 15, a memory; 16, a recording apparatus; 17, an optical system control circuit; 18, a drive circuit of the solid-state imaging device 12; and 19, a control apparatus for controlling each section.

Figure 6:
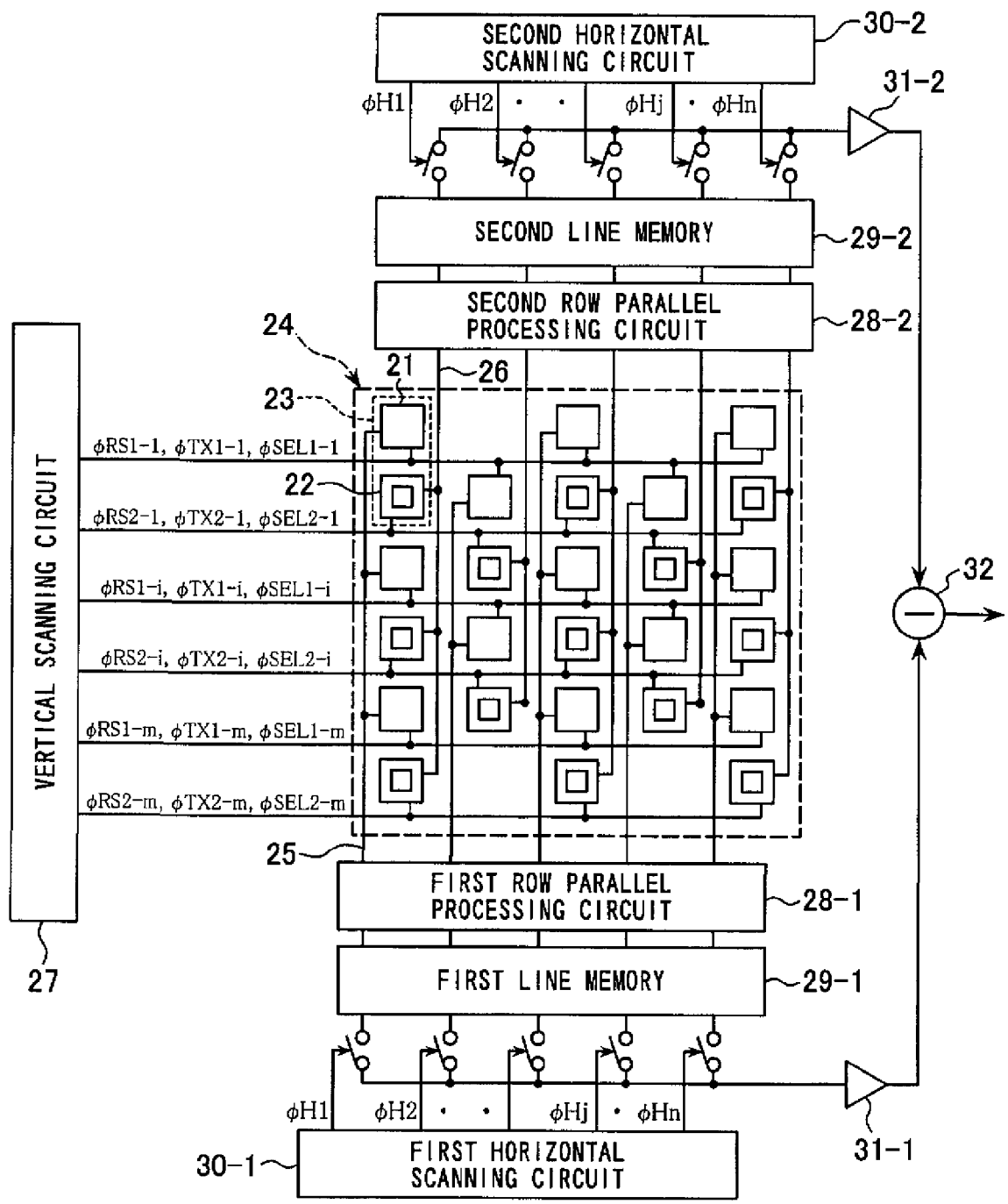
FIG. 6 is a block diagram showing construction of a solid-state imaging device in the solid-state imaging apparatus according to the first embodiment.

A construction of the solid-state imaging device in the solid-state imaging apparatus according to the first embodiment of the invention will now be described by way of a block diagram shown in FIG. 6. Referring to FIG. 6, numeral 21 denotes a first pixel and 22 denotes a second pixel, the first pixel and adjacent second pixel forming a unit pixel 23. Of a plurality of unit pixel columns arranged in the vertical direction, adjacent unit pixel columns are arranged with a shift of ½ unit pixel pitch (equal to one pixel pitch in this example) in the vertical direction from one another, and, in the illustrated example, a pixel section 24 is formed by arranging the unit pixels into m rows and n columns.

Figure 7:
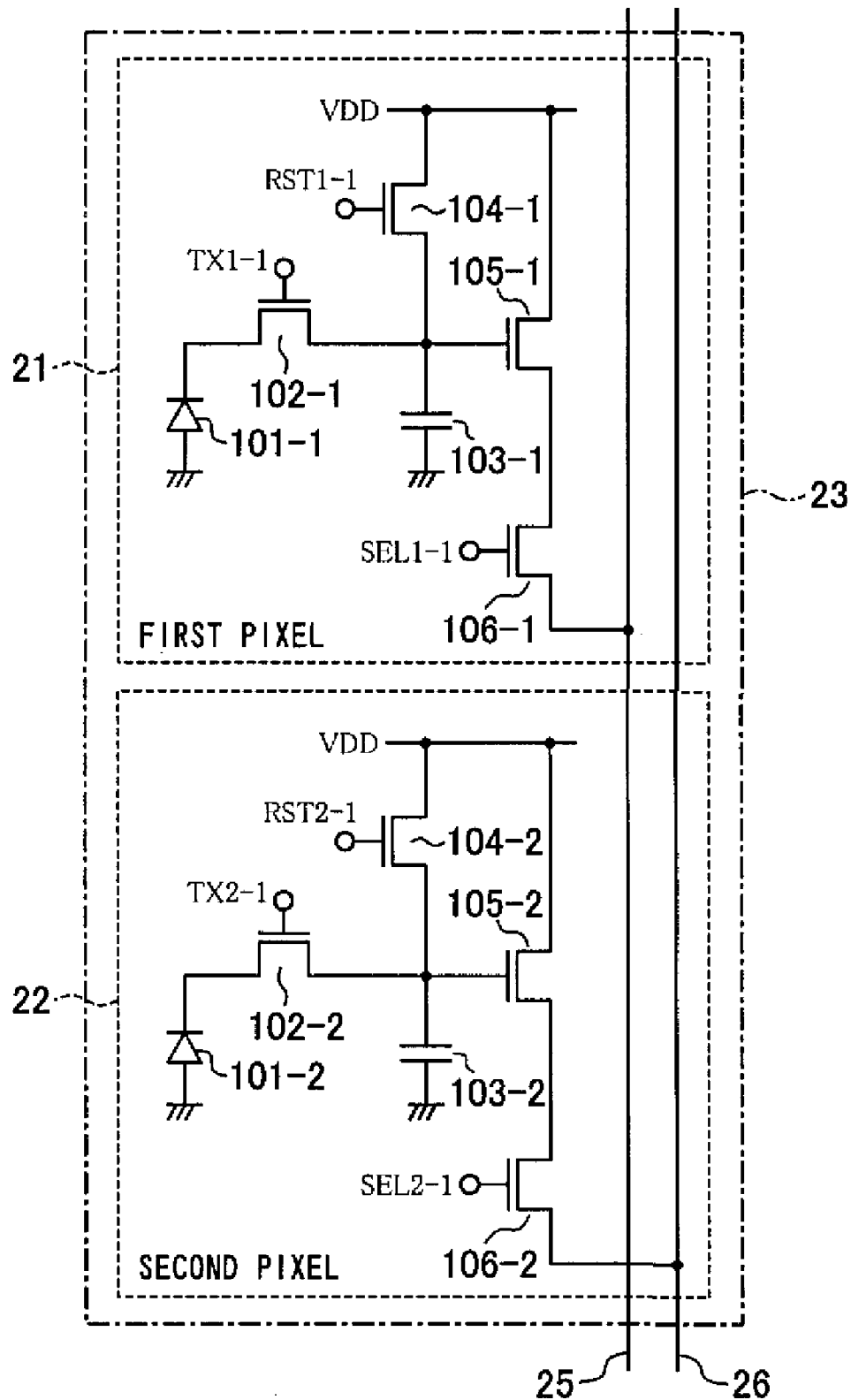
FIG. 7 is a circuit diagram showing construction of a unit pixel in the solid-state imaging device according to the first embodiment shown in FIG. 6.

Each unit pixel 23 is composed of the first pixel 21 and the second pixel 22 as the above. The first and second pixels 21, 22 are of an identical construction as shown in FIG. 7, each including: a photodiode 101-1, 101-2 serving as photoelectric conversion device; a transfer transistor 102-1, 102-2 for transferring signal charge generated at photodiode 101-1, 101-2 to a charge accumulation section 103-1, 103-2; a reset transistor 104-1, 104-2 for resetting the photodiode 101-1, 101-2 and charge accumulation section 103-1, 103-2; an amplification transistor 105-1, 105-2 for amplifying and reading voltage level of the charge accumulation section 103-1, 103-2; and a select transistor 106-1, 106-2 for selecting each pixel to transmit an output of the amplification transistor 105-1, 105-2 respectively to a first and second vertical signal lines 25, 26. These components but the respective photodiodes 101-1, 101-2 of the first and second pixels are shielded from light.

A pixel power supply VDD is connected to drain of the amplification transistor 105-1, 105-2 and to drain of the reset transistor 104-1, 104-2, and a reset signal for resetting the respective pixels corresponding to one row is to be applied to the gate RST-1, RST-2 of each reset transistor 104-1, 104-2. Further, a transfer signal for transferring signal charge at photodiode 101-1, 101-2 of the respective pixels corresponding to one row respectively to the charge accumulation section 103-1, 103-2 is to be applied to the respective gate TX1-1, TX2-1 of each transfer transistor 102-1, 102-2. Furthermore, a select signal for selecting pixels corresponding to one row is to be applied to the gate SEL1-1, SEL2-1 of each select transistor 106-1, 106-2.

Referring to FIG. 6 again, denoted by 27 is a vertical scanning circuit for scanning the pixel section 24. From the vertical scanning circuit 27, a first reset signal φRS1-1 to φRS1-$m$, first transfer signal φTX1-1 to φTX1-$m$, and first select signal φSEL1-1 to φSEL1-$m$ are outputted to each first pixel 21 of the unit pixels in the row direction that are arranged in a manner alternately shifted by one pixel pitch from one another. Similarly, a second reset signal φRS2-1 to φRS2-$m$, second transfer signal φTX2-1 to φTX2-$m$, and second select signal φSEL2-1 to φSEL2-$m$ are outputted to each second pixel 22 of the unit pixels in the row direction that are also arranged in a manner alternately shifted by one pixel pitch from one another.

FIG. 6 includes: 28-1, a first row parallel processing circuit for effecting such processing as FPN (Fixed Pattern Noise) cancel of pixel signals from the photodiode 101-1 of the first pixel 21 of unit pixels corresponding to one row; 29-1, a first line memory for storing the results of processing at the first row parallel processing circuit 28-1; 30-1, a first horizontal scanning circuit where pixel signals of photodiodes 101-1 of the first pixels 21 corresponding to one row stored at the first line memory 29-1 are scanned while being sequentially selected through a select switch and are outputted through a first amplifier 31-1. It also includes: 28-2, a second row parallel processing circuit for effecting such processing as FPN cancel of pixel signals from the photodiode 101-2 of the second pixel 22 of unit pixels corresponding to one row; 29-2, a second line memory for storing the results of processing at the second row parallel processing circuit 28-2; 30-2, a second horizontal scanning circuit where pixel signals of photodiodes 101-2 of the second pixels 22 corresponding to one row stored at the second line memory 29-2 are scanned while being sequentially selected through a select switch and are outputted through a second amplifier 31-2. Denoted by 32 is a difference signal output means for outputting a difference signal between pixel signal from photodiode 101-1 of the first pixel 21 outputted from the first amplifier 31-1, and pixel signal from photodiode 101-2 of the second pixel 22 outputted from the second amplifier 31-2.

Figure 8:
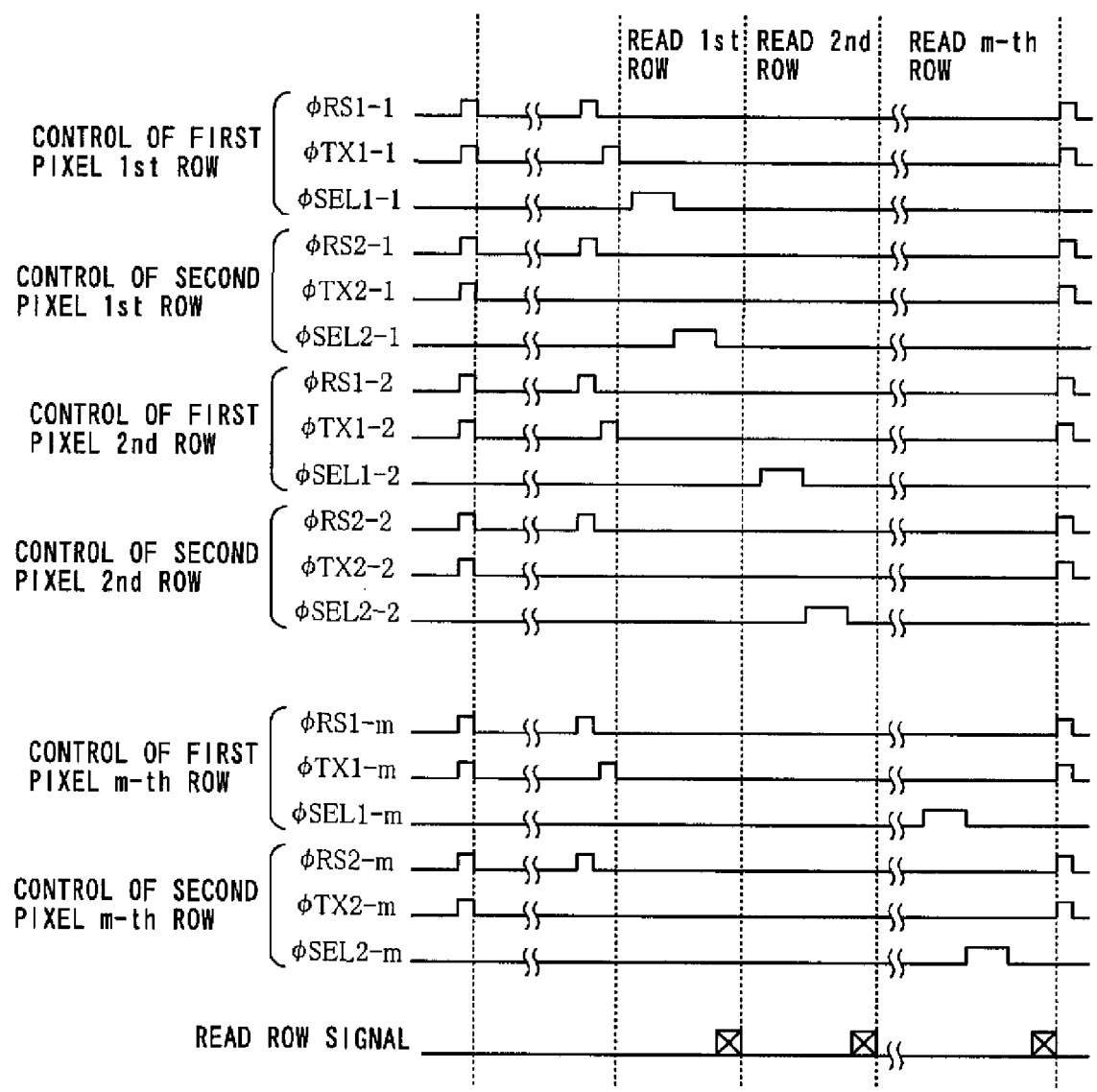
FIG. 8 is a timing chart for explaining operation of the solid-state imaging device according to the first embodiment shown in FIG. 6.

An operation of the solid-state imaging device according to the first embodiment having such construction will now be described by way of a timing chart shown in FIG. 8. First, the first and second reset signals φRS1-1 to φRS1-$m$ and φRS2-1 to φRS2-$m$, and first and second transfer signals φTX1-1 to φTX1-$m$ and φTX2-1 to φTX2-$m$ are simultaneously outputted from the vertical scanning circuit 27 to all rows of the first pixel 21 and the second pixel 22 of each unit pixel 23. The photodiodes 101-1, 101-2 of the first pixels 21 and the second pixels 22 corresponding to all rows are thereby reset. Subsequently, after a certain signal accumulation period (exposure period), the first transfer signals φTX1-1 to φTX1-$m$ are simultaneously outputted from the vertical scanning circuit 27 to all rows of the first pixel 21. The signal charges accumulated within the exposure period at photodiodes 101-1 of the pixels corresponding to all rows of the first pixel 21 are thereby transferred simultaneously for all rows to the charge accumulation section 103-1. It should be noted that transfer of signal charge of the second pixel 22 to the charge accumulation section 103-2 is not effected.

Next, a row-by-row read is started respectively of electric charges accumulated at each charge accumulation section 103-1, 103-2 of the first pixel 21 and the second pixel 22 of the unit pixels. First, as the first select signal φSEL1-1 is outputted to the first pixel 21, the first pixels 21 of the first row are selected so as to read pixel signals to which an extra electric charge Δq for example due to an incidence of oblique light to the charge accumulation section 103-1 is added. Subsequently, the second select signal φSEL2-1 is outputted to the second pixels 22 of the first row so that the second pixels 22 of the first row are selected. Since, however, pixel signal from photodiode is not transferred in the second pixels, only the extra electric charge Δq generated at the charge accumulation section 103-2 is read out.

The signals read out from the first and second pixels 21, 22 are then respectively processed at the first and second row parallel processing circuits 28-1, 28-2, and the results of such processing are stored to the first and second line memory 29-1, 29-2. Next, the pixel signals of the first pixel 21 and the second pixel 22 of the first row stored at the first and second line memory 29-1, 29-2 are simultaneously read out by the first and second horizontal scanning circuits 30-1, 30-2, and are inputted to the difference signal output means 32. A difference signal between the photodiodes of the first and second pixels 21, 22 is then outputted as pixel signal of the unit pixel 23 of the first row based on a differential processing at the difference signal output means 32. After that, by sequentially reading in a similar manner pixel signals of the unit pixels from the second to m-th rows, reading of signals of one frame is complete.

Figure 9A:
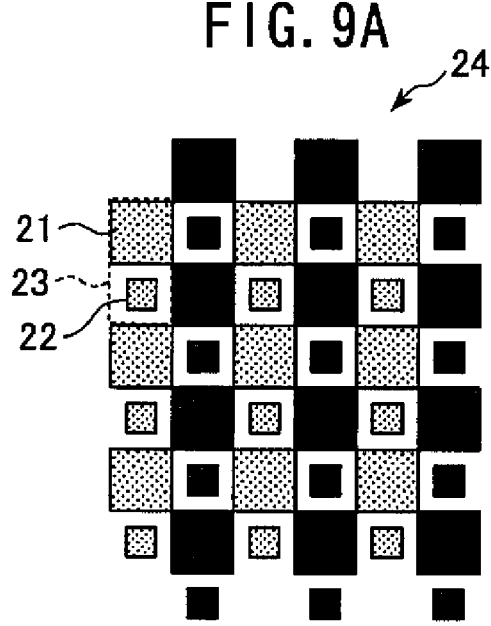
FIGS. 9A to 9D are typical drawings showing the center of gravity of difference signals outputted in the first embodiment as compared to a prior-art example.
Figure 9C:
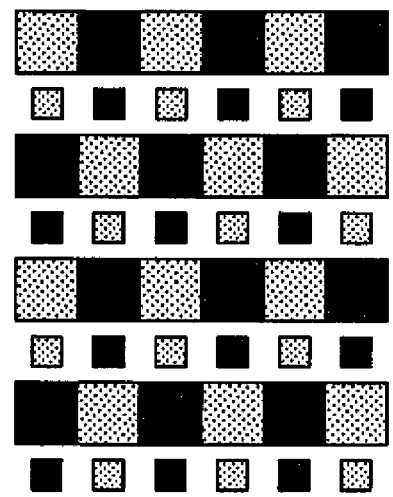
Figure 9B:
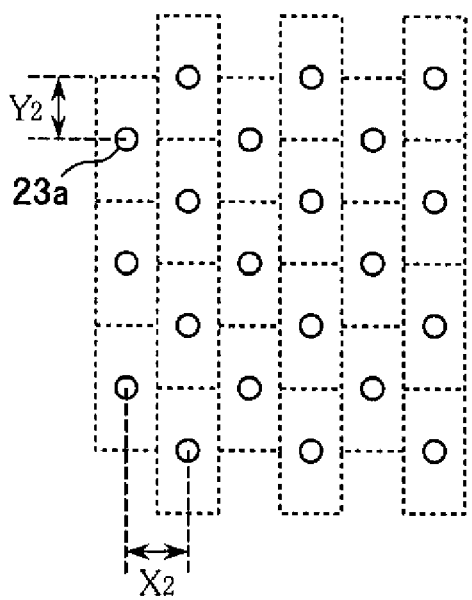

According to this read method, since the difference signal between the pixel signals of the first pixel 21 and the second pixel 22 is outputted, signals canceled of the extra electric charge Δq generated at the charge accumulation section are outputted so that deterioration of output signal is prevented. The centers of gravity of the difference signal outputted at this time are located in a zigzag. In particular, a unit pixel 23 in the present embodiment is composed of a first pixel 21 and a second pixel 22 adjacent to the first pixel 21, and the pixel section 24 is formed such that a unit pixel column arranged in the vertical direction and an adjacently arranged unit pixel column are placed with a shift of ½ unit pixel pitch (1 pixel pitch) from each other as shown in the typical drawing of FIG. 9A. Accordingly, when a difference signal between signal outputted from the first pixel 21 and signal outputted from the second pixel 22 is outputted as imaging signal, the centers of gravity 23a of the pixel signals after the differential are located in a zigzag as shown in FIG. 9B. By interpolating the imaging signals of such a zigzag disposition, a lowered resolution in the vertical direction can be avoided. For the sake of comparison with this embodiment, a prior-art arrangement of unit pixels and location of the centers of gravity after the differential are shown in FIGS. 9C, 9D.

Figure 9D:
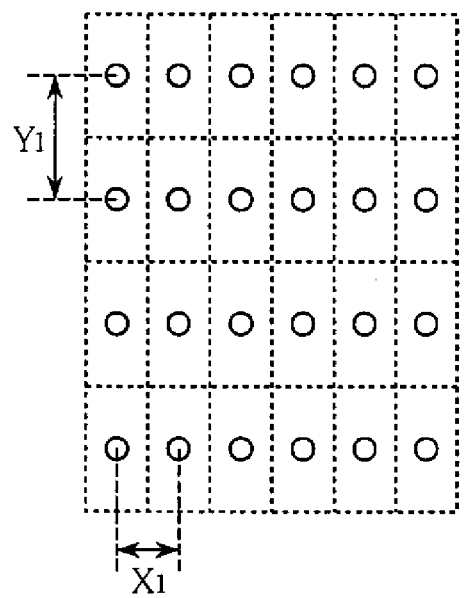

While the distance between each center of gravity of the pixel signals after the differential according to the present embodiment and the distance between each center of gravity of the pixel signals after the differential of the prior-art example are the same with respect to horizontal distances $X_1$, $X_2$ as shown in FIGS. 9B, 9D, the vertical distance or distance $Y_2$ according to the method of the present embodiment is ½ of the vertical distance $Y_1$ of the prior art. According to the present embodiment, therefore, amount of information in the vertical direction becomes greater. An interpolation in the vertical direction thereby becomes simpler and is effective in avoiding a lowering of resolution even when the interpolation is effected in the signal processing circuit 14 at a subsequent stage. Since, after the interpolation, original pixel signals and pixel signals by the interpolation operation alternate in the horizontal direction, deterioration of image quality is also avoided.

Embodiment 2

Figure 10:
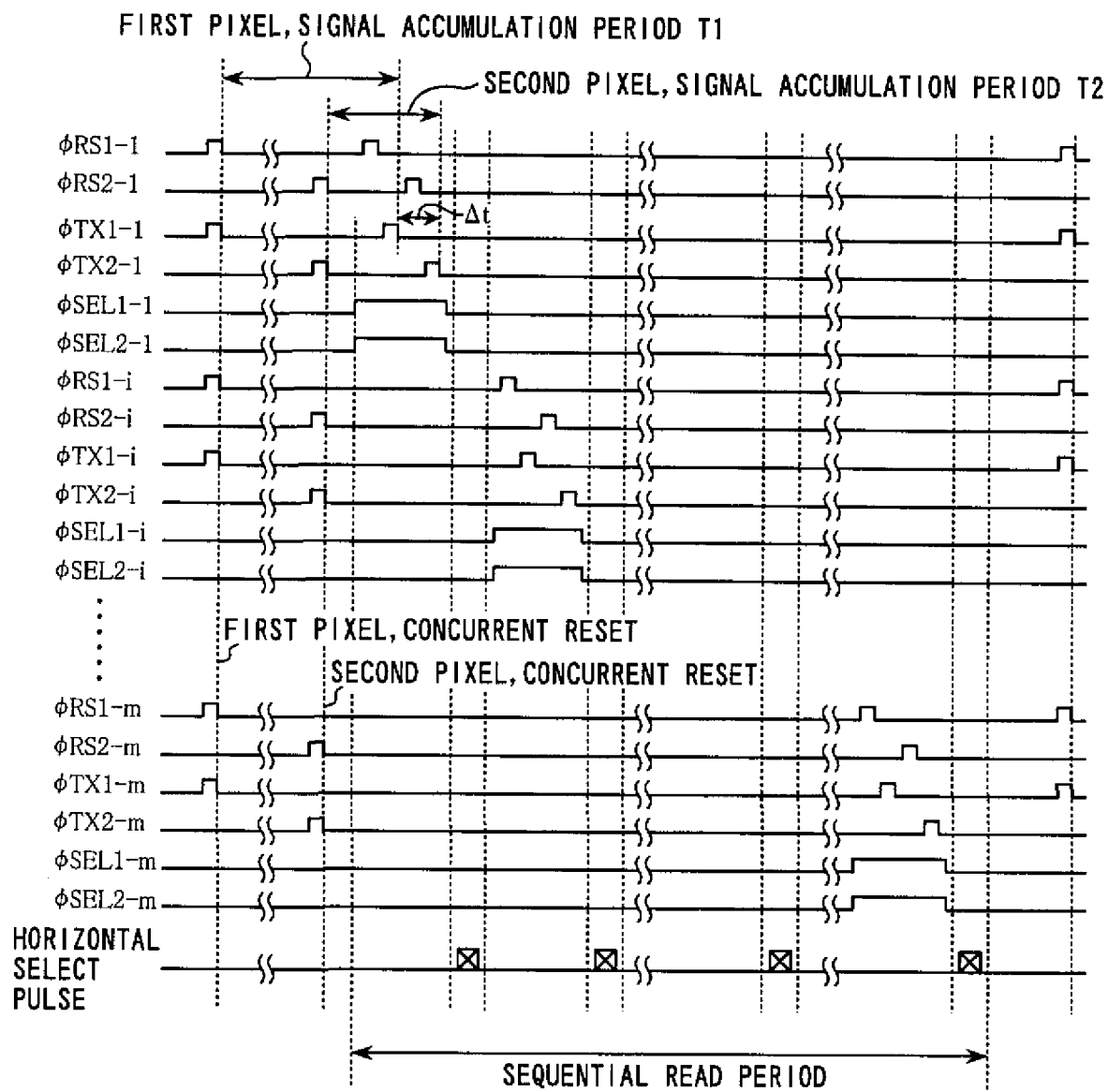
FIG. 10 is a timing chart for explaining operation of the solid-state imaging device in a second embodiment of the invention.

The solid-state imaging apparatus according to a second embodiment of the invention will now be described. A general construction of the solid-state imaging device and construction of the unit pixel according to the second embodiment are similar to the first embodiment, and only difference is the drive method of the pixel section 24 by the drive circuit 18. An explanation based on a diagrammatic representation of the solid-state imaging device will thus be omitted, and the drive method of the solid-state imaging device according to the second embodiment will be described by way of the timing chart shown in FIG. 10. First, the first reset signal φRS1-1 to φRS1-*m* and first transfer signal φTX1-1 to φTX1-*m* are inputted to the first pixel 21 of the unit pixels 23 of all rows of the pixel section 24 to concurrently reset the photodiode and charge accumulation section of the first pixel 21 of the unit pixels of all rows. Next, after passage of a predetermined time (exposure time), the second reset signal φRS2-1 to φRS2-*m* and second transfer signal φTX2-1 to φTX2-*m* are inputted to the second pixel 22 of the unit pixels 23 of all rows to concurrently reset the photodiode and charge accumulation section of the second pixel 22 of the unit pixels of all rows.

Next, the first and second select signals φSEL1-1, φSEL2-1 are inputted to the first and second pixels 21, 22 of the unit pixels of the first row, and subsequently the first and second transfer signals φTX1-1 and φTX2-1 are sequentially inputted thereto. The pixel signals of the first and second pixels 21, 22 of the unit pixels of the first row are thereby selected and read out. The two signals are similarly differentiated at the difference signal output means, and such difference signal is outputted as pixel signal of the unit pixels of the first row. After that, the pixel signals of the unit pixels of the second row and after are sequentially outputted in a similar manner.

At this time, period from the point in time of the concurrent reset of photodiodes of the first pixels 21 of each unit pixel to the inputting of the first transfer signal φTX1-1 to the first pixel 21 becomes a signal accumulation period T1 of the photodiodes of the first pixels 21, and period from the point in time of the concurrent reset of photodiodes of the second pixels 22 to the inputting of the second transfer signal φTX2-1 to the second pixel 22 becomes a signal accumulation period T2 of the photodiodes of the second pixels 22. The time difference Δt between the respective second-time inputting of the first and second transfer signals φTX1-1, φTX2-1 to the first and second pixels 21, 22 is then very short as compared to (T1-T2) period. Accordingly, a difference signal between the photodiodes of the first pixel 21 and of the second pixel 22 is constituted only of signal by accumulation during the difference between the signal accumulation period T1 of the photodiode of the first pixel 21 and the signal accumulation period T2 of the photodiode of the second pixel 22, or in other words the signal by accumulation in a predetermined period (exposure period) between the concurrent reset time of the photodiodes of the first pixels 21 and the concurrent reset time of the photodiodes of the second pixels 22.

By the above drive method, it is possible to uniform the exposure time of all pixels so that concurrent exposure signals are obtained. Accordingly, an imaging signal can be obtained without deterioration of S/N in the imaging signal output due to effect of dark current or KTC noise. Also in this embodiment, the centers of gravity of the signals after the differential are similarly located in a zigzag so that amount of information in the vertical direction becomes greater and an interpolation is also easier. Further, since original pixel signals and the pixel signals by interpolation are alternately arranged in the horizontal direction, deterioration of image quality is avoided.

Figure 11:
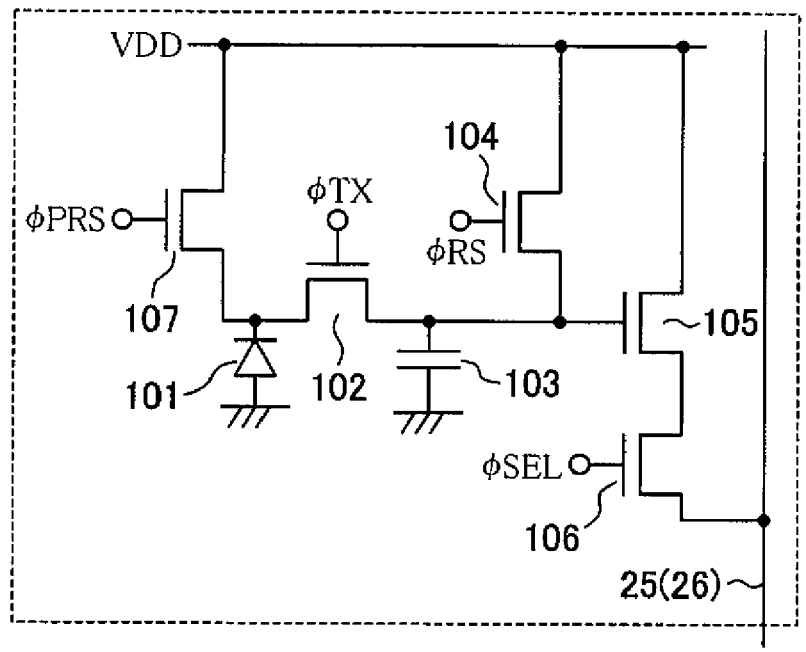
FIG. 11 is a circuit diagram showing a modification of a unit pixel in the solid-state imaging apparatus according to the invention.

While, in the above embodiments, 4-Tr construction consisting of 4 transistors has been shown as those of the first and second pixels of the unit pixel of the pixel section, it is also possible to use pixels of the construction as shown in FIG. 11 where a discharge transistor 107 for resetting electric charge of the photodiode 101 is additionally provided. In such a case, the discharge transistor 107 is turned ON and is subsequently turned OFF simultaneously for all pixels to start exposure. The rest of the operation is similar to that of 4-Tr construction.

Figure 12:
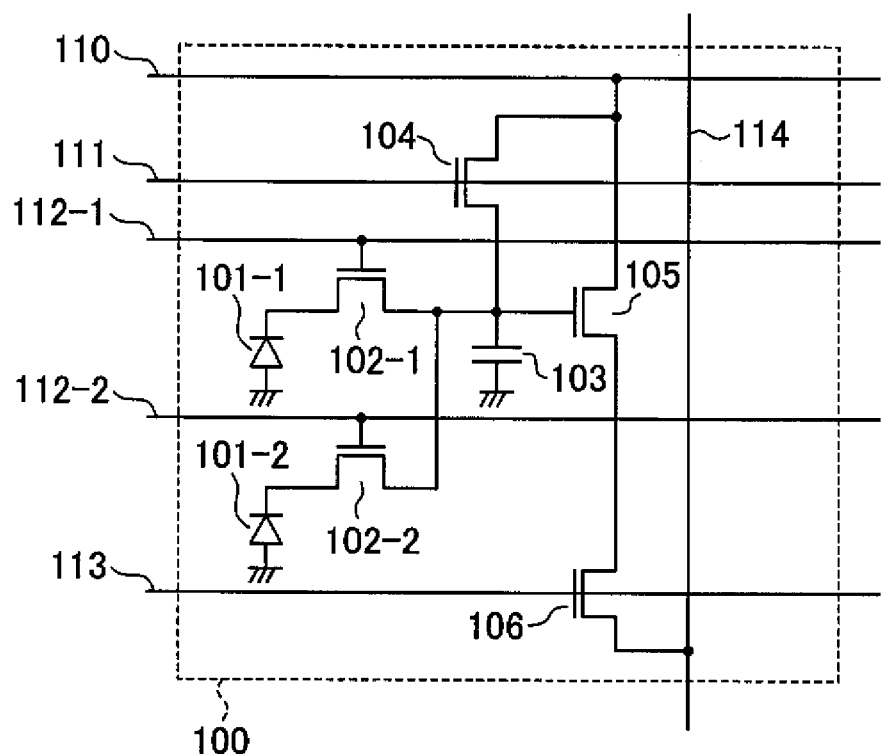
FIG. 12 is a circuit diagram showing another modification of the unit pixel in the solid-state imaging apparatus according to the invention.

Further, the unit pixel in the above embodiments has been shown as consisting of two or the first and second pixels of the same construction. The unit pixel, however, may be constructed as one where two photodiodes are provided in a pixel of the conventional 4-Tr construction and corresponding two transfer transistors are provided as shown in FIG. 12 instead of constituting the unit pixel by two pixels. In particular, a unit pixel 100 includes: a first photodiode 101-1 and a second photodiode 101-2; a first and second transfer transistors 102-1, 102-2 for respectively transferring signal charges generated at the first and second photodiodes 101-1, 101-2 to a charge accumulation section 103; a reset transistor 104 for resetting the charge accumulation section 103 and first and second photodiodes 101-1, 101-2; an amplification transistor 105 for amplifying and reading voltage level of the charge accumulation section 103; and a select transistor 106 for selecting the pixel to transmit an output of the amplification transistor 105 to a vertical signal line 114. Here, the first and second photodiodes 101-1, 101-2 are provided as having the same size on the same one semiconductor substrate at image forming locations that are optically regarded as the same, and those components but the first and second photodiodes 101-1, 101-2 are shielded from light.

It should be noted that, in FIG. 12, denoted by 110 is a pixel power supply, which is electrically connected respectively to drain of the amplification transistor 105 and to drain of the reset transistor 104. 111 is a reset line for resetting pixels corresponding to one row, which is electrically connected to gate of the reset transistor 104 of the pixels corresponding to one row. 112-1, 112-2 are a first and second transfer lines for transferring signal charges of the first photodiode 101-1 and the second photodiode 101-2 of the pixels corresponding to one row respectively to the charge accumulation sections 103 of each pixel, which are respectively electrically connected to the gates of the first and second transfer transistors 102-1, 102-2 of the pixels corresponding to one row. 113 is a select line for selecting pixels corresponding to one row, which is electrically connected to the gate of the select transistors 106 corresponding to one row.

What is claimed is:
1. A solid-state imaging apparatus comprising:
a solid-state imaging device including
a pixel section having a plurality of unit pixels for generating imaging signal associated with an object, each unit pixel formed of a first pixel and a second pixel adjacent to the first pixel where the plurality of unit pixels are two-dimensionally arranged so that a shift in a first direction occurs between a first group of unit pixels arranged in said first direction and a second group of unit pixels arranged in said first direction, wherein the first group of unit pixels and the second group of unit pixels are adjacent in a second direction different from said first direction, a read drive section where one or more pixels of first pixels and one or more pixels of second pixels are respectively treated as a read unit group so as to effect read operation by said read unit group based on a setting signal inputted from an external source, and a difference signal output means for generating a difference signal between a first signal outputted from said first pixel and a second signal outputted from said second pixel to output the difference signal as the imaging signal associated with said each unit pixel; and an interpolating operation section for interpolating the imaging signal at a predetermined location between said unit pixels based on imaging signals outputted from said difference signal output means.

2. The solid-state imaging apparatus according to claim 1, wherein said first pixels and said second pixels comprise respectively a photoelectric conversion device, an accumulation section for accumulating a signal generated at the photoelectric conversion device, and a transfer section for transferring said signal generated at said photoelectric conversion device to said accumulation section, and wherein said read drive section simultaneously resets all of said first pixels and said second pixels and, after a predetermined time, drives said transfer section of all of said first pixels to transfer signals generated at said photoelectric conversion device during said predetermined time to said accumulation section, and subsequently causing the signals accumulated at each accumulation section of said first pixels and said second pixels to be outputted to said difference signal output means.

3. The solid-state imaging apparatus according to claim 1, wherein said first pixels and said second pixels comprise respectively a photoelectric conversion device, an accumulation section for accumulating a signal generated at the photoelectric conversion device, and a transfer section for transferring said signal generated at said photoelectric conversion device to said accumulation section, and wherein said read drive section simultaneously resets all of said first pixels and, after a predetermined time, simultaneously resets all of said second pixels, and subsequently driving each transfer section of said first pixels and said second pixels to transfer signals generated at said photoelectric conversion device to each accumulation section and causing the signals accumulated at each accumulation section of said first pixels and said second pixels to be outputted to said difference signal output means.

* * * * *